May 11, 1954    E. S. L. BEALE    2,678,406
CIRCUITS FOR CATHODE RAY OSCILLOSCOPES
Filed June 13, 1951
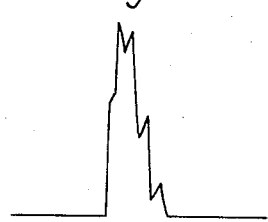
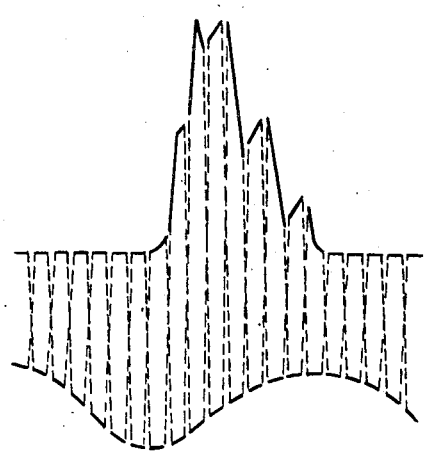
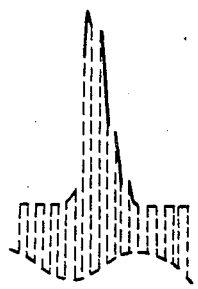
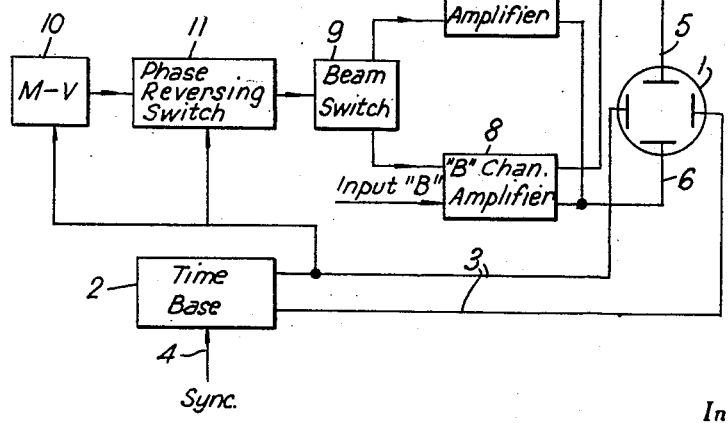
Inventor
EVELYN S. L. BEALE
By Robert Harding
Attorney Patented May 11, 1954

2,678,406

UNITED STATES PATENT OFFICE 2,678,406

CIRCUITS FOR CATHODE RAY OSCILLOSCOPES

Evelyn Stewart Lansdowne Beale, Stanwell Moor, near Staines, England, assignor to International Standard Electric Corporation, New York, N. Y., a corporation of Delaware Application June 13, 1951, Serial No. 231,403

4 Claims. (Cl. 315—24)

1

The present invention relates to circuits for cathode ray oscilloscopes of the kind adapted to produce on a single oscilloscope screen a plurality of traces each representative of electric variations from a difference source.

Where two traces are to be produced, the use of special kinds of oscilloscope tubes having two beams is well known. In one of these kinds, two complete electron gun assemblies with X- and Y-deflecting plates are provided, producing beams spaced apart in the Y-direction. This is theoretically a good arrangement, but in practice it suffers from the difficulty of making the two assemblies accurately enough for the X-sensitivities to be identical. The result is that more or less complicated electrical circuits have to be used to make the X-deflections on the two beams correspond accurately, as is essential for use with a time base.

A further type of oscilloscope employing two beams uses a split beam from a single electron gun. In this case three Y-deflecting plates are provided, the central one acting as a beam splitter and lying between the two beams and the two outer plates serving, in co-operation with the central plate, to deflect the two beams respectively. In this case identical deflections in the X co-ordinate are obtainable for both beams, but the Y-deflection plates cannot be operated in push-pull for the independent deflection of each beam as is often essential.

Another proposal has been to use a single beam and to switch a single beam in such a manner that the different traces are recorded in different strokes; in the case of two traces, alternate traces are representative of different electric variations. When indicating mechanical phenomena which are not exactly repeated at each stroke, for example, this is not satisfactory, and it has been proposed to switch at a much higher frequency, whereby each trace is chopped, the beam first reproducing a small part of one trace and then a small part of the other trace. It has been found possible to effect the switching at frequencies up to about 40 kc./s. and nevertheless to obtain a satisfactory switch-over from one trace to the other. However, there are many sharply peaked waveforms which are not reproduced satisfactorily when chopped even at this high switching frequency. Many of the details of such highly peaked waveforms are lost owing to the chopping. It might appear to be possible to overcome this difficulty, so far as visual observation is concerned, by making the switch run asynchronously so that successive chopped traces overlap to some extent with one another

2 and eventually fill up the gaps. However, in practice, this is not found to be entirely satisfactory because although the switch is run out of synchronism with the time base, the chopping wave often appears as a drifting pattern on the screen, moving to the right or left. This is because the switching frequency is liable not to differ greatly from an exact multiple of the time base frequency, especially as the switching frequency is normally very much greater than the time base frequency.

The present invention has for its object to provide an improved circuit for an oscilloscope of the kind specified which employs a normal type of oscilloscope tube having a single beam and in which the objections referred to above in reproducing highly peaked waveforms are substantially reduced.

According to the present invention, a circuit for an oscilloscope of the kind specified comprises a time base generator for generating deflecting oscillations for application to the X-deflecting means of an oscilloscope, switching means operating at a frequency much greater than that of the time base generator for connecting the plurality of sources of electric variations successively to the Y-deflecting means of the oscilloscope and means operating in step with the time base oscillation for varying the phase of the switching in such a manner that, in the case of each trace, the portions thereof produced on the screen in successive X-deflections interlace with one another.

The invention will now be described with reference to the accompanying drawing, of which Figs. 1–4 are included for explanatory purposes, and Fig. 5 illustrates a preferred embodiment in block formation. Figs. 1–4 show, respectively, a peaky waveform; the same wave-form chopped by a simple double-beam switch, and, for contrast, a smooth wave chopped by the same switch; the wave-forms of Fig. 2 chopped by an interlacing beam switch arrangement according to the present invention; and in Fig. 4, an enlargement of a part of Fig. 3.

Fig. 1 shows a typical peaky wave-form of a type produced by internal combustion engines, and which it is desired to show on a double-beam oscilloscope without loss of significant detail.

Fig. 2 shows the same wave-form when chopped by a simple double-beam switch of well-known pattern, in comparison with a smooth wave-form chopped by the same switch, and displayed together on the same tube as a double-beam trace. This figure shows that 50% of each wave-form is lost in the beam-sharing process;

and while this loss is of no importance in the case of the smooth-wave-form, since its shape is clearly predictable from point to point, this is certainly not true in the case of the upper waveform, where many of the important peaks have been lost in the chopping process, and only a hint as to their former existence remains.

Fig. 5 illustrates in block diagram form a preferred embodiment of the invention, all of the blocks being constituted by well-known circuit arrangements.

The oscilloscope 1 to the right of the figure comprises the usual horizontal and vertical deflection plates, the pair for the X-deflection being connected to the time base unit 2 by leads 3. The time base unit may be itself synchronised to an external phenomenon (via the lead 4), such as the crankshaft of an internal combustion engine.

Each of the vertical- or Y-deflection plates is separately connected via leads 5 and 6 respectively to similar amplifiers 7 and 8—the "A" channel amplifier, 7, and the "B" channel amplifier, 8—through which the phenomena to be studied may be separately and simultaneously applied to the oscilloscope screen. These phenomena are indicated as "Input 'A'" and "Input 'B'" respectively.

The amplifiers are controlled as to their conductivity by a beam switch 9 by means of which the oscilloscope beam is made avaliable to the two phenomena in alternate cycles of the switch. The switching is effected in well-known manner by means of a switching oscillation of substantially rectangular wave-form generated by a multi-vibrator 10. This oscillation is applied through a phase-reversing switch 11, to be referred to later, to the beam switch 9, whereby the amplifiers are rendered operative alternately.

The phase-reversing switch 11 in Fig. 5 serves to reverse the phase of the switching oscillation from 10 on receipt of a pulse from the time base circuit 2 (which is separate and distinct from any time base circuit associated with 10), this pulse being arranged to occur once every cycle of the time base, for example, during the fly-back stroke thereof. Thus, on one stroke of the timebase, the positive impulse reaching the beam switch occurs at a time when the negative impulse would have arrived if the phase had not been reversed, and vice-versa. In this way, the whole of the waveform is reproduced on each beam during two successive strokes of the time base.

The effect produced is illustrated in Figs. 3 and 4 which show the pattern produced by an interlaced double beam switch drawing the two wave-forms of Fig. 2, Fig. 4 being an enlargement of one of the simpler parts of Fig. 3 for purposes of clarity. During one X-deflection, each trace is made up of a number of short lines (interconnected by the thin solid traces in Fig. 4) and during the next successive X-deflection, the small lines produced (interconnected by the thin dotted traces in Fig. 4) interlace with those produced in the preceding tranversal so as to give two continuous traces, in contradistinction to known systems wherein the short lines produced in each succeeding trace overlie those produced in the preceding trace. The principle is equally applicable to other wave forms, however complex, provided they are recurrent.

The method will obviously not be applicable to the case of photographing a trace where there is only a single transient, but it will enable a photograph of a complete trace to be made when the exposure is limited to a very small number of cycles, such as two.

Various ways of obtaining the interlacing may be employed, based on different ways of obtaining the phase reversal. For example, the phase reversing switch may be, as shown in Fig. 5, a separate entity comprising a doubly-stable multivibrator; or it may be combined with the multivibrator 10, pulses from the X-time base generator 2 being applied (via a conductor provided in this instance) to prevent one, or to insert an additional, switch-over of the multi-vibrator 10 in each cycle of the X-deflection, thus effecting the desired phase reversal of the switching oscillator.

While the principles of the invention have been described above in connection with specific embodiments, and particular modifications thereof, it is to be clearly understood that this description is made by way of example and not as a limitation on the scope of the invention.

What I claim is:

1. A circuit for an oscilloscope of the type having a single electron beam and two pairs of deflecting elements designated as X and Y deflecting elements respectively for deflecting the beam in directions at right angles to one another, comprising a time base generator for generating deflecting oscillations, means connecting said generator to said X deflecting element, a plurality of sources of electric variations, switching means operable at a frequency substantially greater than that of said time base generator alternately connecting said sources of electric variations to said Y deflecting elements, and means operating in step with the time base oscillations to invert the phase of said switching means for each trace, whereby the portions thereof produced on the oscilloscope screen in successive X deflections are interlaced with one another.

2. A circuit as claimed in claim 1, wherein the said switching means and the said phase reversing means comprise separate multi-vibrators.

3. A circuit as claimed in claim 1 wherein the said switching means and the said phase reversing means comprise a single multi-vibrator adapted to be phase-reversed once per cycle of the said X-deflection time-base.

4. A circuit for an oscilloscope having an electron beam and two pairs of deflecting elements respectively for deflecting the beam in directions at right angles to one another comprising a time base generator connected to said X deflecting element, a plurality of sources of electrical potential, at least one of said potentials being variable, switching means operable at a frequency substantially greater than that of said time base generator alternatively connecting said sources of electrical potential to said Y deflecting elements, and means operating in step with the time base oscillations to invert the phase of said switching means for each trace, whereby the portions thereof produced on the oscilloscope screen in successive X deflections are interlaced with one another.

References Cited in the file of this patent

UNITED STATES PATENTS

| Number | Name | Date |
|---|---|---|
| 2,089,430 | Roys et al. | Aug. 10, 1937 |
| 2,221,115 | Shepard, Jr. | Nov. 12, 1940 |
| 2,364,190 | Burgess | Dec. 5, 1944 |
| 2,444,338 | Dimond | June 29, 1948 |
| 2,584,144 | Maresca | Feb. 5, 1952 |